(12) United States Patent
Clayton et al.

(10) Patent No.: US 7,083,182 B2
(45) Date of Patent: Aug. 1, 2006

(54) TWO-WHEELED RECOVERY TRAILERS

(75) Inventors: John Clayton, Lapworth (GB); Roger Walford, Old Alcester Road (GB); Sean O'Connell, Blackpool (GB); Charles Murray, Preston (GB)

(73) Assignees: RAC Motoring Services, Walsall (GB); LPD Limited, Preston (GB)

( * ) Notice: Subject to any disclaimer, the term of this patent is extended or adjusted under 35 U.S.C. 154(b) by 0 days.

(21) Appl. No.: 10/515,858

(22) PCT Filed: May 23, 2003

(86) PCT No.: PCT/GB03/02251

§ 371 (c)(1),
(2), (4) Date: Mar. 24, 2005

(87) PCT Pub. No.: WO03/099608

PCT Pub. Date: Dec. 4, 2003

(65) Prior Publication Data

US 2005/0161900 A1    Jul. 28, 2005

(30) Foreign Application Priority Data

May 25, 2002  (GB) .................................. 0212123.4

(51) Int. Cl.
*B60P 3/06* (2006.01)
(52) U.S. Cl. ..................... 280/402; 280/656; 280/79.4; 280/35; 280/639; 280/38
(58) Field of Classification Search ............... 280/656, 280/402, 79.4, 35, 639, 38
See application file for complete search history.

(56) References Cited

U.S. PATENT DOCUMENTS

| 2,701,069 | A |   | 2/1955 | Hawkins |          |
|-----------|---|---|--------|---------|----------|
| 3,817,558 | A | * | 6/1974 | Eger    | 280/491.4|
| 3,913,934 | A |   | 10/1975| Koehn et al. | |
| 4,384,817 | A |   | 5/1983 | Peterson |         |

(Continued)

FOREIGN PATENT DOCUMENTS

| CH | 656356 A   | 6/1986  |
|----|------------|---------|
| DE | 74 25 000 U| 11/1976 |
| DE | 4011620 A  | 10/1990 |
| EP | 008931 A1  | 3/1980  |
| GB | 2226994 A  | 7/1990  |
| GB | 2236511 A  | 4/1991  |

*Primary Examiner*—Lesley D. Morris
*Assistant Examiner*—Marlon Arce-Diaz
(74) *Attorney, Agent, or Firm*—Davis & Bujold, P.L.L.C.

(57) ABSTRACT

A trailer (10) for the recovery of vehicles has a drawbar (12) having first and second sections (14,16) hinged together at adjacent ends, about a horizontal transverse axis; the first section (14) of the drawbar (12) has a ball cup (24) by which it may be secured to a towing hitch (100) of a recovery vehicle, the second section (16) of the drawbar (12) has a pair of arms (30) pivotally mounted adjacent the end thereof remote from the end hinged to the first section (14), the arms (30) are pivotal between a stowed position in which they are disposed parallel to the drawbar (12) and a deployed position in which they are disposed coaxially of one another on an axis transverse to the longitudinal axis of the drawbar (12); a pair of wheel pans (50) are mounted and able to slide, one on each of the arms (30), the wheel pans (50) are interconnected to the second section (16) of the drawbar (12) by a linkage mechanism (60, 62), so that when the arms (30) are in the stowed position, the wheel pans (50) are slid inwardly towards the pivot connections of the arms (30) to the drawbar (12) and, when the arms (30) are in the deployed position, the wheel pans (50) being slid outwardly towards the free ends of the arms (30); a self steering wheel (70) being mounted on each of the arms (30), the self steering wheels (70) being disposed outboard of the wheel pans (50) when the arms (30) are in the deployed position.

23 Claims, 7 Drawing Sheets

U.S. PATENT DOCUMENTS

| | | | |
|---|---|---|---|
| 4,640,523 A | * | 2/1987 | Wolmarans .............. 280/491.4 |
| 4,723,401 A | * | 2/1988 | Webster et al. ............... 56/377 |
| 4,921,390 A | * | 5/1990 | Baines ...................... 414/483 |
| 4,974,407 A | * | 12/1990 | Rowe et al. .................. 56/377 |
| 5,342,162 A | * | 8/1994 | Robinette et al. ........... 414/483 |
| 5,387,001 A | | 2/1995 | Hull et al. |
| 5,711,542 A | * | 1/1998 | Kendall ................... 280/491.4 |
| 6,164,897 A | * | 12/2000 | Edwards ..................... 414/537 |

\* cited by examiner

TWO-WHEELED RECOVERY TRAILERS

The present invention relates to trailers and in particular to trailers used by recovery vehicles, the trailers being adapted to support the wheels on one axle of the vehicle being recovered.

One form of trailer for use in the recovery of vehicles comprises a drawbar which may be attached to the towing hitch of the recovery vehicle. A cross-member is mounted transversely on the drawbar, the cross-member having wheels mounted at each end. Inboard of the wheels are a pair of wheel pans, which are adapted to support either the front or rear wheels of the vehicle being recovered. The wheel pans may be mounted on the cross-member so that they are adjustable laterally in order to accommodate vehicles with different tracks. The wheel base of the trailer is however normally fixed.

When not in use, because of the size of the trailer, it would normally be stowed externally of the recovery vehicle, unless the trailer may be partially dismantled to be stowed within the recovery vehicle.

The present invention provides a compact recovery trailer which may be stowed completely within a normal recovery vehicle, for example a panel van, and may be rapidly deployed and rapidly stored after use.

In accordance with one aspect of the present invention, a trailer for the recovery of vehicles comprises:
  a drawbar with means for attachment to a towing vehicle, a pair of wheels attached to the drawbar and a pair of wheel pans secured to the draw bar, characterised in that:
  the drawbar has first and second sections, the first and second sections being hinged together at adjacent ends, about a horizontal transverse axis;
  the first section of the drawbar having means by which it may be secured to a towing hitch of a recovery vehicle, at an end thereof remote from the end hinged to the second section;
  the second section of the drawbar having a pair of arms pivotally mounted adjacent an end thereof remote from the end hinged to the first section, the arms being pivotal between a stowed position in which they are disposed parallel to the drawbar, one on either side of the drawbar in juxtaposed relationship thereto, to a deployed position in which they are disposed coaxially of one another, on an axis transverse to the longitudinal axis of the drawbar;
  the wheel pans being mounted and able to slide, one on each of the arms, the wheel pans being interconnected to the second section of the drawbar by a linkage mechanism, so that when the arms are in the stowed position, the wheel pans are slid inwardly towards the pivot connections of the arms to the drawbar and, when the arms are in the deployed position, the wheel pans being slid outwardly towards the free ends of the arms; and
  a self steering wheel being mounted on each of the arms, the self steering wheels being disposed outboard of the wheel pans when the arms are in the deployed position.

With the trailer described above, when the arms are in the deployed position the trailer may be attached to the towing hitch of a recovery vehicle to allow a vehicle to be towed as with conventional trailers of this type. However, when not in use, the arms of the trailer with the wheel pans and self steering wheels attached thereto may be moved to the stowed position and the drawbar may be folded about its hinge point, to form a compact assembly, which may easily be stowed in the back of a normal recovery vehicle.

According to a preferred embodiment of the invention, a pivot bracket is preferably provided in the back of the recovery vehicle to which the free end of the first section of the drawbar may be pivotally attached. A winch may also be provided by which pivoting of one section of the drawbar relative to the other may be controlled. The winch may also be used to recover the broken down vehicle and pull in onto the trailer.

Means, for example a screw mechanism or hydraulic and pneumatic means, may also be provided for moving the arms between their deployed and stowed positions.

According to a preferred embodiment of the invention, the linkage mechanism connecting the wheel pans to the drawbar may be adjustable to adjust the position of the wheel pans to match the track of the vehicle being recovered. Furthermore, the self steering wheels are preferably secured to the wheel pans so that the track of the trailer will also be adjusted with the wheel pans.

It is also desirable that the self steering wheels are interconnected so that the steering angles of the two wheels are the same and to prevent the wheels from vibrating independently due to single wheel impacts, for example when one of the wheels is subjected to a discreet disturbance such as a pothole or kerb strike. The two wheels may be interconnected by a mechanical link, such a link would however have to be articulated to accommodate movement of the arms and adjustable to accommodate variation in the track. According to a preferred embodiment, the wheels are interconnected hydrostatically, each wheel having a steering arm which is connected to a double acting ram, the two rams being interconnected by means of flexible hose so that as one of the wheels pivots about its axis the movement is transmitted to the other wheel.

The present invention is now described, by way of example only, with reference to the accompanying drawings, in which.

Figure 1:
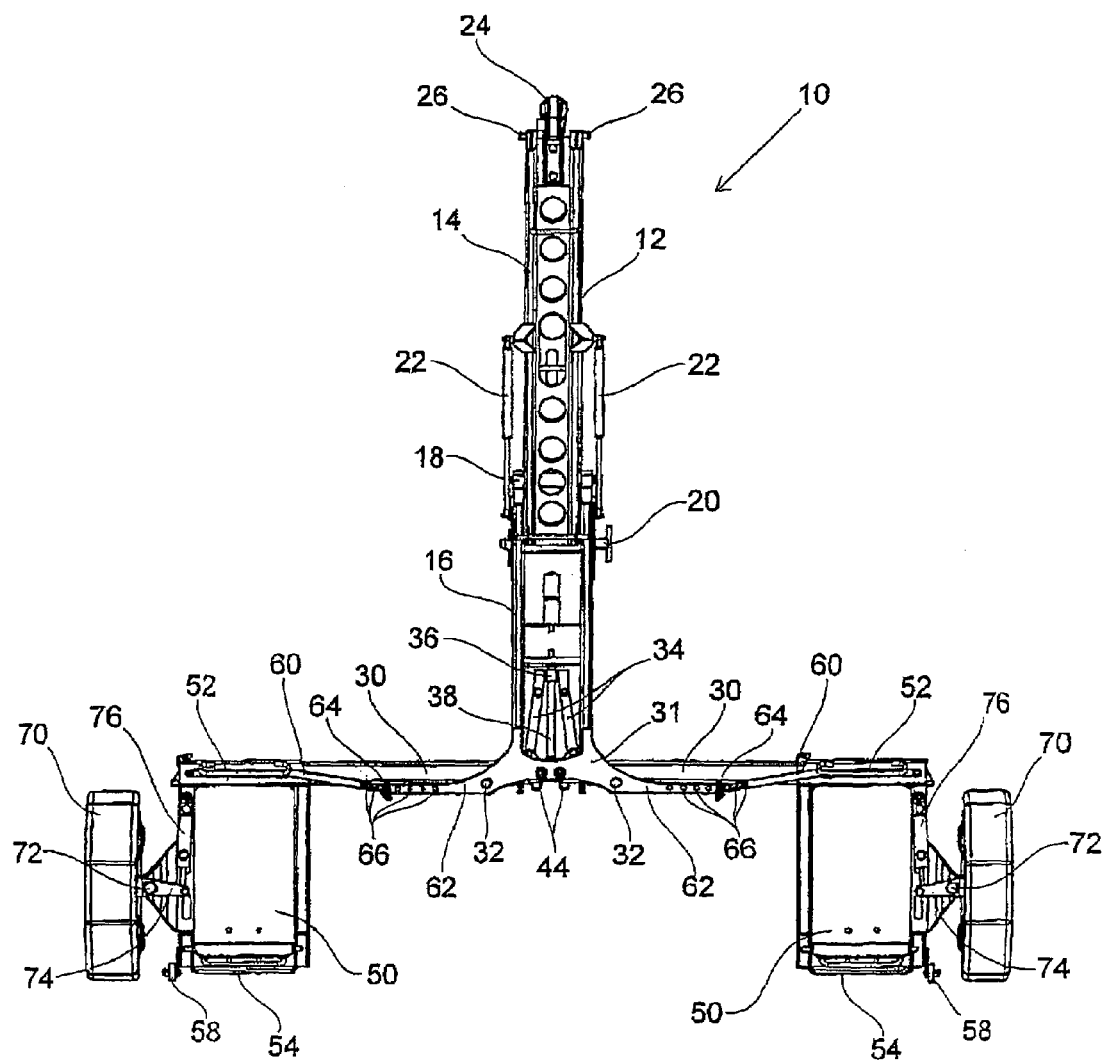
FIG. 1 is a plan view of a trailer in accordance with the present invention, in its deployed configuration.

As illustrated in the drawings, a trailer 10 has a drawbar 12. The drawbar 12 is formed in two sections, a forward section 14 and a rearward section 16. The forward and rearward sections 14,16 are pivoted together about adjacent ends, by pivot pin 18 so that the sections 14 and 16 may be disposed end to end, or the rearward section 16 may be folded underneath the forward section 14. The end of the forward section 14 extends beyond the pivot pin 18 and has apertures therein, the apertures aligning with corresponding apertures in the rearward section 16 when sections 14 and 16 are disposed end to end, so that a locking pin 20 may be inserted through the apertures, to lock the drawbar in its extended position. A stop (not shown) is provided to prevent the sections 14 and 16 going past the position in which the apertures are aligned.

A pair of gas struts 22 are provided between the forward and rearward sections 14 and 16 of the drawbar 12 to assist and control relative movement of the sections 14 and 16, as the drawbar 12 is moved between its folded and extended positions.

A towing hitch, for example a ball joint cup 24 is secured to the forward end of position 14 of the drawbar 12, for attachment to a towing hitch 100 of the recovery vehicle. A pair of trunions 26 are also provided adjacent the forward end of the forward section 14 of drawbar 12, one extending to each side thereof.

Figure 2:
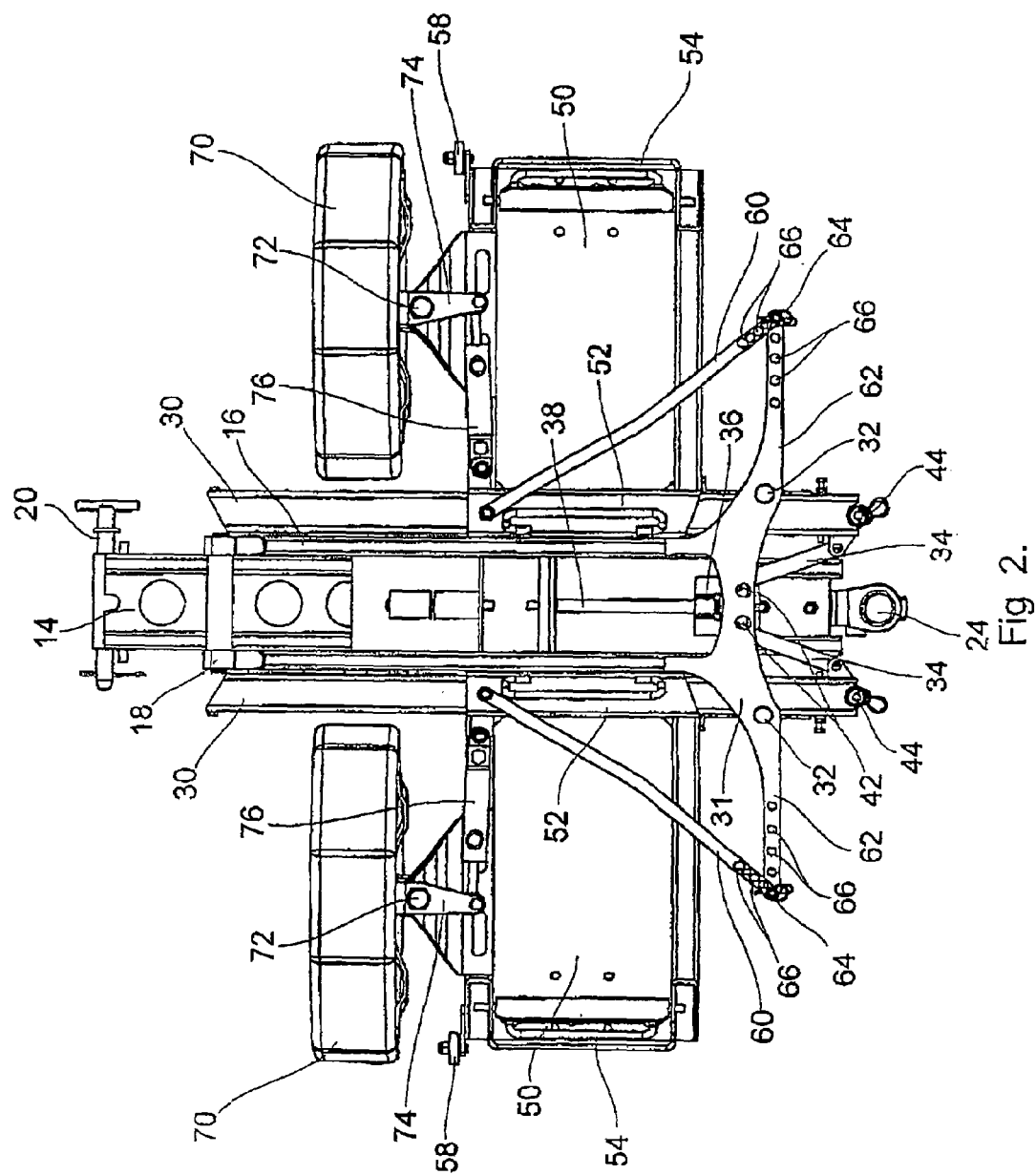
FIG. 2 shows a front view of the trailer illustrated in FIG. 1, in its stored configuration.
Figure 3:
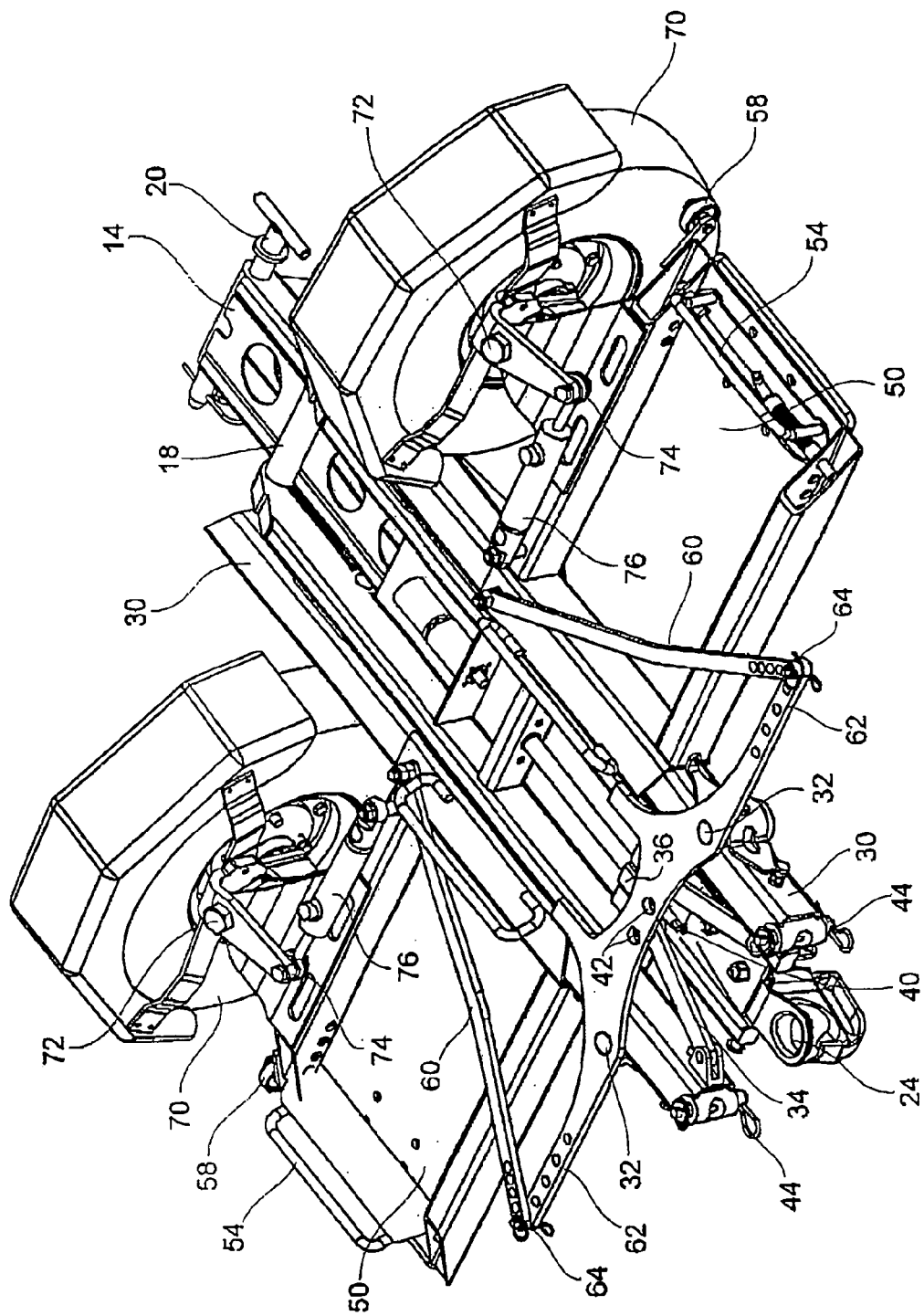
FIG. 3 shows a perspective view of the trailer in its stored configuration.
Figure 4:
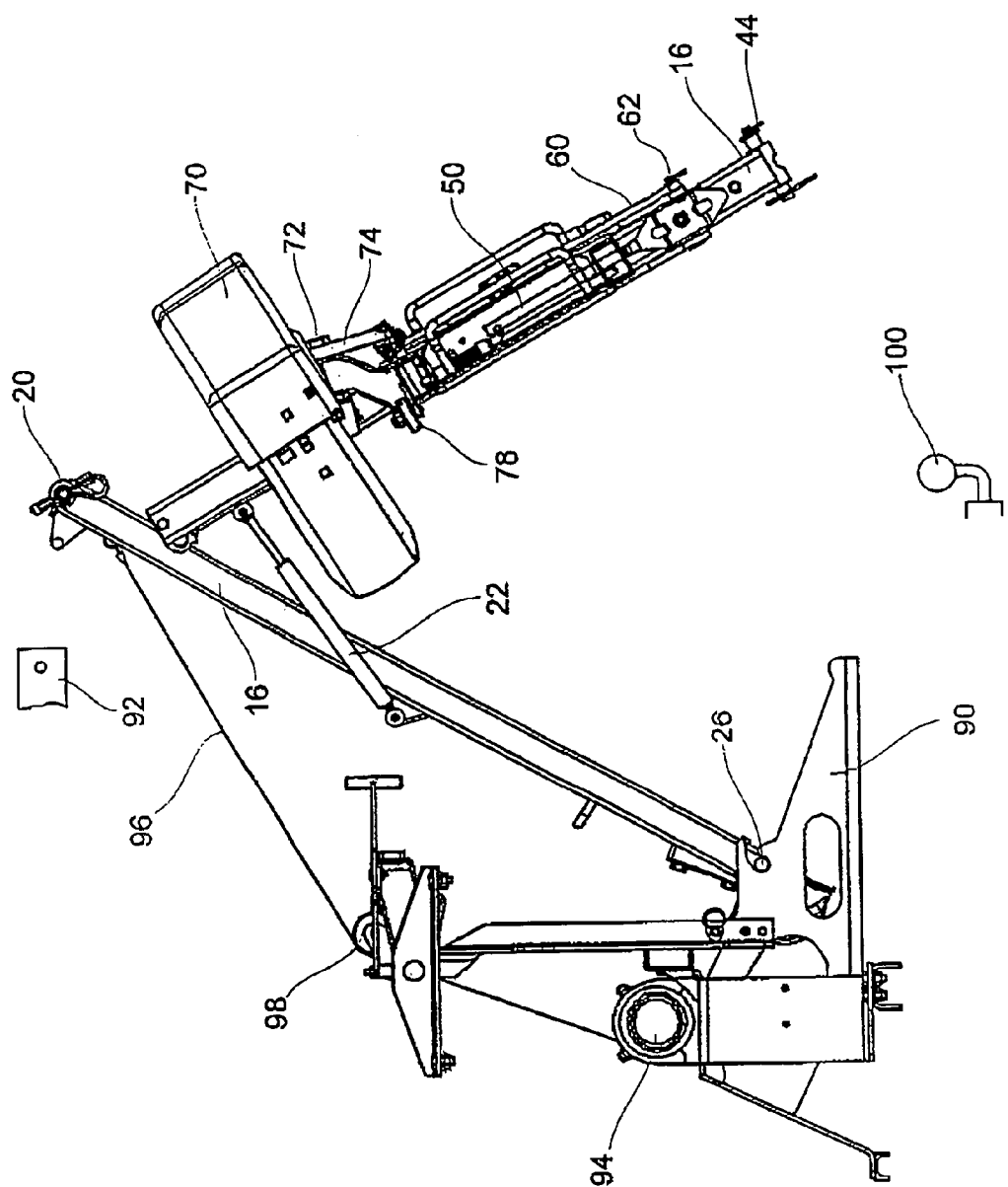
FIG. 4 shows a side elevation of the trailer shown in FIG. 1, illustrating a first stage of deployment of the trailer.

A pair of arms 30 are pivotally mounted to a bracket 31 secured to the rear end of the rearward section 14 or the drawbar 12. The arms 30 are mounted by means of pivot pins 32, for movement in the plane of the rear section 16 of the drawbar 12. The arms 30 extend beyond the pivot pins 32 and a pair of links 34 extend from the end of each arm 30 to a block 36 mounted for axial movement on a lead screw 38. A drive formation 40 is provided on the lead screw 38 by which the lead screw 38 may be rotated to move the block 36 linearly, causing the arms 30 to pivot about pins 32, between a stowed position in which the arms 30 are disposed parallel and in juxtaposed relationship to the rearward section 14 of the drawbar 12, as illustrated in FIGS. 2 and 3; and a deployed position in which the arms 30 extend transversely of the axis of the drawbar 12, as illustrated in FIG. 1. In the deployed position, apertures at the end of arm 30 are aligned with apertures 42 in the bracket 31 so that locking pins 44 may be located through apertures 42, to lock the arms 30 in their deployed positions.

A pair of wheel pans 50 has tubular mounting means 52, which locate and slide one on each of the arms 30. The wheel pans 50 define a platform for the wheels of the towed vehicle. Spring loaded adjustable chocks 54 are provided at the rearward end of the pans 50, which will be depressed as the wheel of the vehicle is moved onto the pan 50 and will spring up to help retain the towed vehicle on the trailer 10. Additional fastening means, for example straps or chains are also provided for securing the towed vehicle.

Links 60 are pivotally connected between the pans 50 and projections 62 on the bracket 31, the links 60 causing the wheel pans 50 to slide outwardly on arms 30 as the arms are moved between their stored and deployed positions and to slide inwardly on arms 30 as the arms 30 are moved between their deployed and stowed positions. The links 60 are secured to the projections 62 by means of locking pins 64 which engage through aperture 66 in the ends of links 60 and projections 62. Several apertures 66 are provided in both the links 60 and projections 62, by which the effective length of the links 60 may be adjusted. The separation of the wheel pans 50 when the arms 30 are in their deployed positions, may thereby be adjusted to suit the track of the towed vehicle.

A pair of self steering wheels 70 are mounted one on each of the wheel pans 50, the self steering wheels 70 being mounted on the outside of the wheel pans 50, when the arms 30 are in their deployed positions. The self steering wheels 70 are mounted on kingpins 72 which extend substantially vertically but are inclined at appropriate camber and castor angles to provide a self-steering effect. Steering levers 74 are provided on each of the self steering wheels 70, the steering levers 74 being connected to double-acting rams 76 mounted on the wheel pans 50. The rams 76 on either side of the trailer 10 are interconnected by flexible hydraulic hoses 78, the forward chamber of one ram 76 being connected to the forward chamber of the other ram 76 and the rearward chamber of one ram 76 being connected to the rearward chamber of the other ram 76. The connected chambers thereby form closed hydraulic circuits by which any steering movement of one wheel 70 will be transmitted to the opposite wheel 70. For example, when the left wheel 70 is steered to the left due to its self steering properties, the volume of the forward chamber 84 on the left ram 76 decreases forcing fluid to be transferred to the forward chamber 84 on the right ram 76 causing the right wheel 70 to be steered to the left. This steering motion causes the volume of the rearward chamber 86 of the right ram 76 to decrease and forces fluid into the rearward chamber 86 of the left ram 76, which is consistent with the applied steering motion. This fluid transfer works in the opposite sense to steer both wheels 70 to the right.

In this manner, the wheels 70 will remain in phase to minimise tyre scrub and steering shimmy, particularly when the trailer 10 is subjected to any uneven forces, for example, when one wheel 70 is subject to discreet disturbance such as a pothole or kerb strike. Furthermore, interlinking of the wheels 70 in this manner will resist and damp out any unwanted motion of the wheels 70. The amount of steering damping can be varied by adjusting the sizes of the hoses 78 or fitting restrictors 82, to control the rate of flow of fluid.

An isolation valve 80 may be provided between the rams 76, in order to lock the wheels 70 when, for example, reversing.

The use of flexible hoses 78 as described above allows for movement of the wheels 70 between the deployed and stowed positions of the trailer 10 and also permits adjustment of the track of the trailer 10.

In the stowed position, as illustrated in FIG. 2, the trailer is disposed substantially vertically in the rear of the recovery vehicle, the trunions 26 on the forward section 14 of the drawbar 12 engaging a pivot bracket 90 which is mounted to the floor of the recovery vehicle. The stowed trailer 10 may be locked in position in the recovery vehicle by, for example, means of the locking pin 20 which may engage apertures in a suitable locking bracket 92 mounted within the recovery vehicle.

A winch 94 may also be provided in the recovery vehicle, the winch cable 96 passing over pulley means 98 and being secured to the drawbar 12 adjacent the interconnection of the forward and rearward sections 14, 16 thereof.

To deploy the trailer the locking pin 20 is released from the bracket 92 within the recovery vehicle and the forward section 14 of the drawbar 12 is permitted to pivot rearwardly about trunions 26, movement thereof being controlled by the winch 94. As the forward section 14 pivots rearwardly the rearward section 16 of the drawbar 12 pivots away from the forward section 14 under the influence and control of the gas struts 22.

When the wheel pans 50 and wheels 70 are clear of the recovery vehicle, as illustrated in FIG. 3, the locking pins 64 may be engaged through suitable apertures 66 in the links 60 and projections 62 on bracket 31, to provide an appropriate separation of the wheel pans 50 to match the track of the vehicle to be towed.

Figure 5:
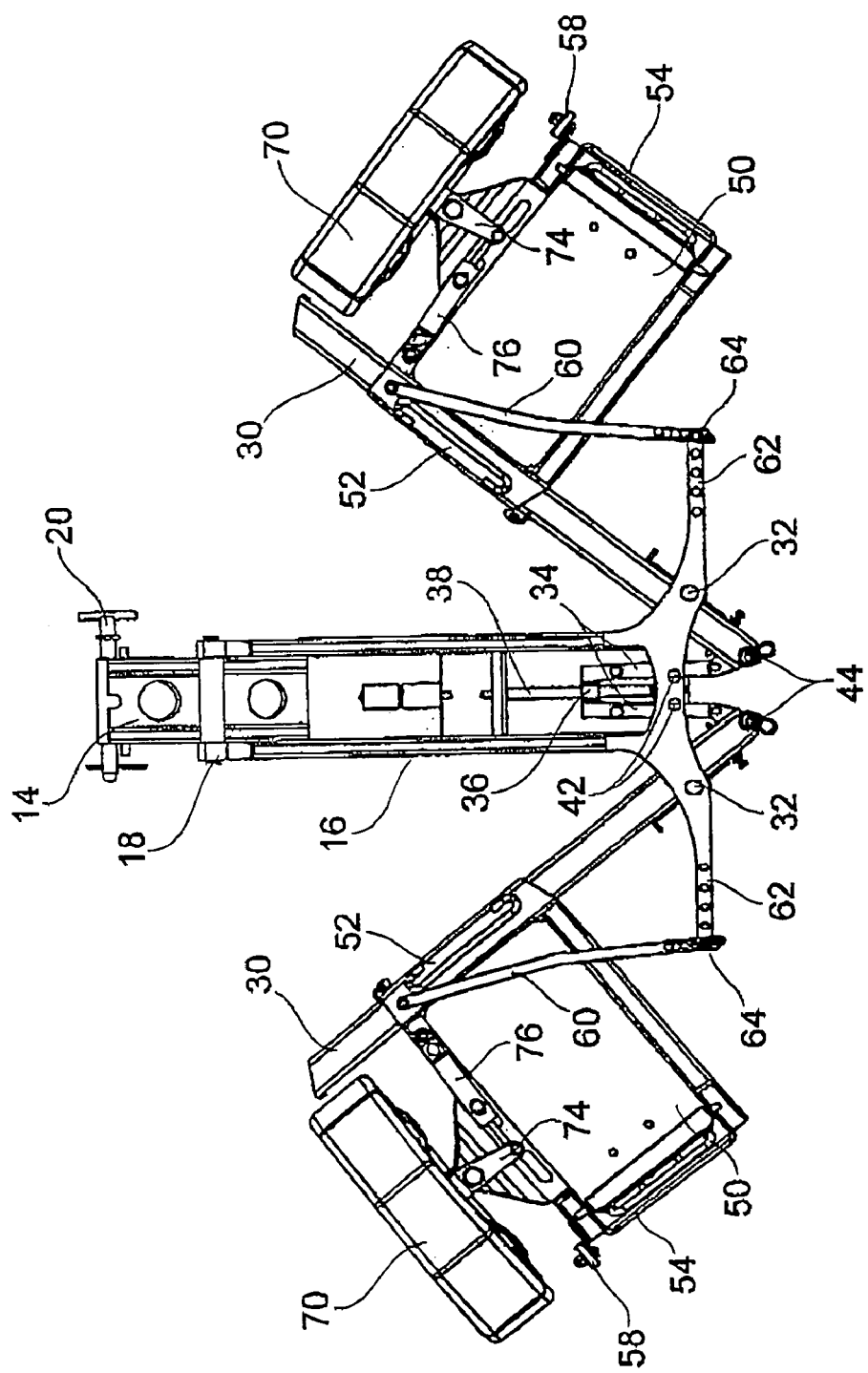
FIG. 5 shows a plan view of the trailer shown in FIG. 1, illustrating a second stage of the deployment of the trailer.
Figure 6:
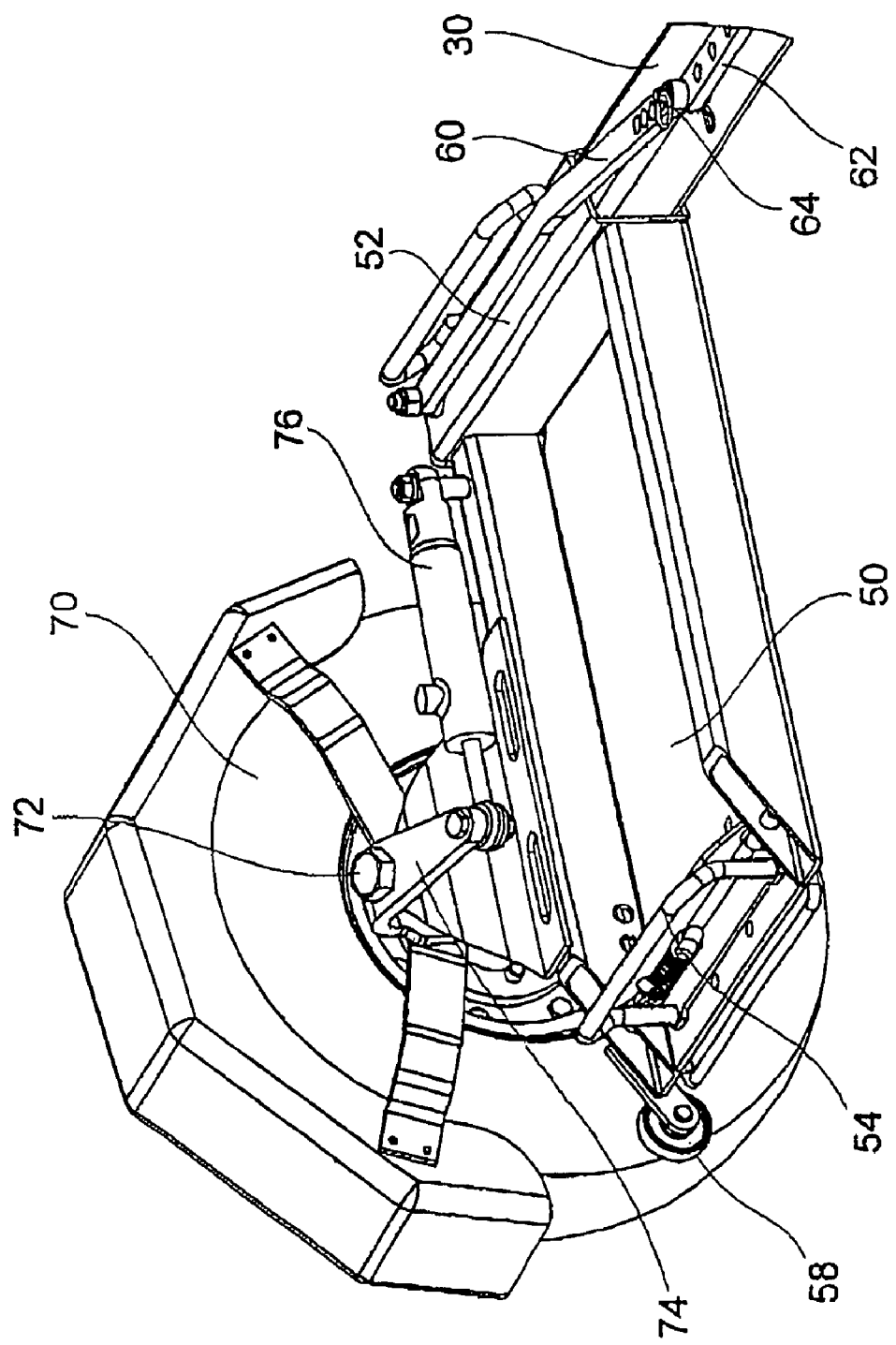
FIG. 6 shows a detailed perspective view of a wheel pan and wheel of the trailer illustrated in FIG. 1.
Figure 7:
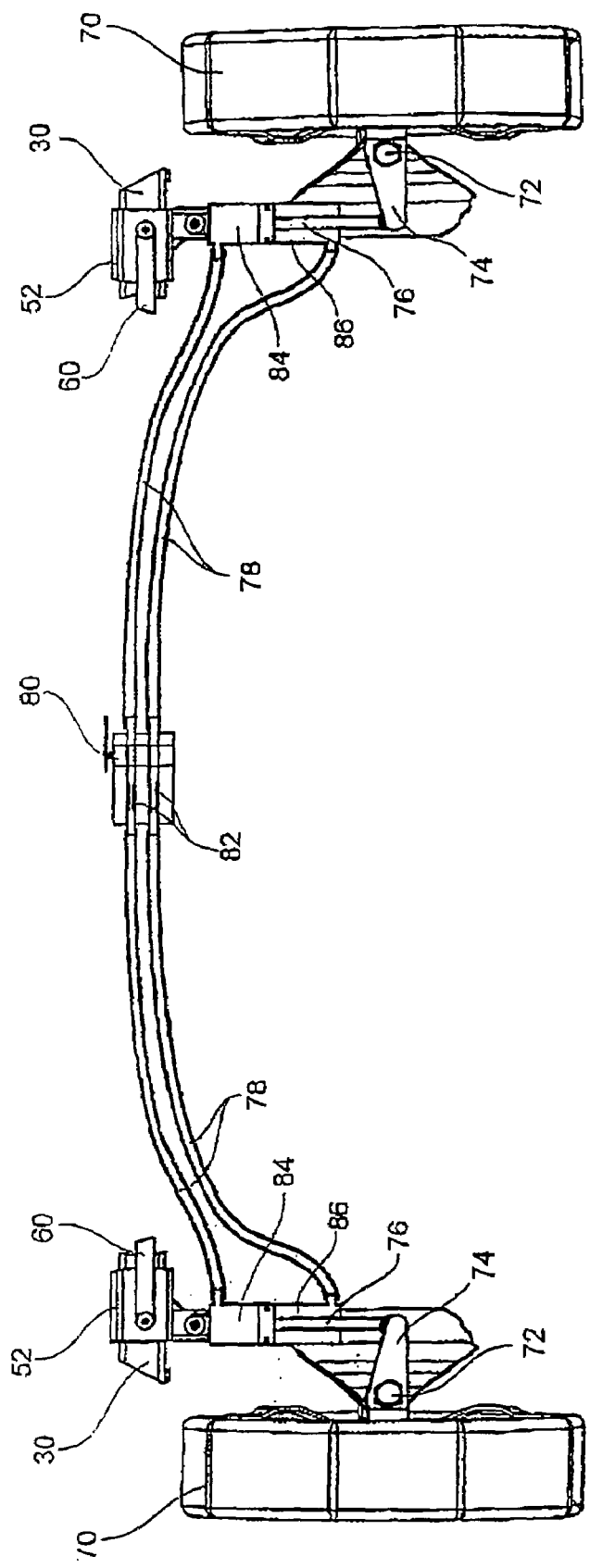
FIG. 7 illustrates diagrammatically a hydrostatic steering linkage for the trailer illustrated in FIG. 1.

The lead screw 38 may then be rotated to pivot arms 30 outwardly, as illustrated in FIG. 5, until the arms 30 extend transversely of the longitudinal axis of the drawbar 12. Locking pins 44 are then located through the apertures in the ends of arms 30 and apertures 42 in the bracket 31 to lock the arms 30 in position.

The forward section 14 of drawbar 12 is then lowered further by means of the winch 94 until the forward and rearward sections are brought to the fully deployed position, when the locking pin 20 is located through the aligned apertures therein. As the forward section 14 of the drawbar 12 is lowered, small rollers 58 at the rear of the wheel pans 50 will first engage the ground permitting the wheel pans 50 to move backwardly until the self steering wheels 70 come into engagement with the ground.

After the sections 14,16 of the drawbar 12 have been locked in the deployed position by pin 20, the front of the drawbar 12 may then be lifted, either manually or by means of the winch 94, from the mounting bracket 90 and the ball joint cup 24 engaged with the towing hitch 100 of the recovery vehicle.

Detachable ramps (not shown) are then attached to the trailing edge of the wheel pans 50 and the winch 94 is used to draw the vehicle being recovered onto the wheel pans 50 and the vehicle is located and secured to the trailer 10 using the adjustable wheel chocks 54 and restraining straps.

The reverse procedure is used to stow the trailer 10 after use.

Various modifications may be made without departing from the invention. For example while in the above embodiment a winch 94 is used to deploy/stow the trailer 10 and to draw the vehicle being recovered onto the trailer 10, a dedicated power drive, for example an electric or hydraulic drive may be provided to deploy/stow the trailer 10. Also while a leadscrew 38 is used to deploy the arms 30, other means, for example a hydraulic or pneumatic ram, may be used for this purpose.

The locking pins 20, 44 used to lock the drawbar 20 and arms 30 in their deployed positions may be replaced by any suitable, releasable latch means.

In a further embodiment of the invention the wheels of the trailer 10 may be secured directly to the arms 30, so that the track of the trailer 10 is fixed or is adjustable independently of the wheel pans 50.

The invention claimed is:

1. A trailer (10) for the recovery of vehicles comprising:
a drawbar (12) with means (24) for attachment to a towing vehicle, a pair of wheels (70) attached to the drawbar (12) and a pair of wheel pans (50) secured to the drawbar (12) characterized in that:
the drawbar (12) has first and second sections (14, 16), the first and second sections (14, 16) being hinged together at adjacent ends, about a horizontal transverse axis;
the first section (14) of the drawbar (12) having means (24) by which it may be secured to a towing hitch (100) of a recovery vehicle, at an end thereof remote from the end hinged to the second section (16);
the second section (16) of the drawbar (12) having a pair of arms (30) pivotally mounted adjacent an end thereof remote from the end hinged to the first section (14), the arms (30) being pivotal between a stowed position in which they are disposed parallel to the drawbar (12), one on either side of the drawbar (12) in juxtaposed relationship thereto and a deployed position in which they are disposed coaxially of one another on an axis transverse to the longitudinal axis of the drawbar (12);
the wheel pans (5) being mounted and able to slide, one on each of the arms (30), the wheel pans (50) being interconnected to the second section (16) of the drawbar (12) by a linkage mechanism (60, 62), so that when the arms (30) are in the stowed position, the wheel pans (50) are slid inwardly towards the pivot connections of the arms (30) to the drawbar (12) and, when the arms (30) are in the deployed position, the wheel pans (50) being slid outwardly towards the free ends of the arms (30); and
a self steering wheel (70) being mounted on each of the arms (30), the self steering wheels (70) being disposed outboard of the wheel pans (50) when the arms (30) are in the deployed position.

2. The trailer (10) according to claim 1, wherein the releasable locking means (20) is provided between the first and second sections (14, 16) of the drawbar (12), to lock the drawbar (12) in the deployed position.

3. The trailer (10) according to claim 2, wherein a locking pin (20) engages through aligned apertures in the first and second sections (14, 16) of the drawbar (12) the lock the drawbar (12) in the deployed position.

4. The trailer (10) according to claim 1, wherein releasable means (44) is provided to lock the arms (30) in their deployed position relative to the second section (16) of the drawbar (12).

5. The trailer (10) according to claim 4, wherein locking pins (44) engage through aligned apertures in the arms (30) and the second section (16) of the drawbar (12).

6. The trailer (10) according to claim 1, wherein the means (22) are provided to assist and control relative movement is the first and second sections (14, 16) of the drawbar (12) as they are moved between their stowed and deployed positions.

7. The trailer (10) according to claim 6, wherein one or more gas struts (22) act between the first and second sections (14, 16) of the drawbar (12).

8. The trailer (10) according to claim 1, wherein the linkage mechanisms (60, 62) between the wheel pans (50) and the second section (16) of the drawbar (12) are adjustable, to permit adjustment of the lateral position of the wheel pans (50).

9. The trailer (10) according to claim 8, wherein a link (60) pivotally attached to each wheel pan (50) is pivotally attached to a formation (62) on the second section (16) of the drawbar (12) by means of a pin (64) which engages through aligned apertures (66) in the link (6) and the formation (62), a plurality of apertures (66) being provided in the link (60) and/or the formation (62) to permit adjustment of the linkage mechanism (60, 62).

10. The trailer (10) according to claim 1, wherein the means (34, 36, 38) is provided for moving the arms (30) between the stowed and deployed positions.

11. The trailer (10) according to claim 10, wherein the drive means comprises a pair of links (34), each link (34) being mounted at one end to one of the arms (3), the other end of each link (34) being mounted to linear drive means (38), so that movement of the drive means (38) in one direction will move the arms from their stowed to their deployed positions and movement of the drive means in the opposite direction will move the arms (3) from their deployed to their stowed positions.

12. The trailer (10) according to claim 11, wherein the linear drive means (38) is a leadscrew, hydraulic or pneumatic ram.

13. The trailer (10) according to claim 1, wherein the self steering wheels (70) are mounted on the wheel pans (50).

14. The trailer (10) according to claim 1, wherein the self steering wheels (70) are interconnected so that they will adopt the same steering angle.

15. The trailer (10) according to claim 14, wherein the self steering wheels (70) are interconnected hydrostatically.

16. The trailer (10) according to claim 15, wherein the self steering wheel s (70) each have a steering arm (74) which is attached to a double acting ram (76); a first chamber (84) on the ram (76) attached to one wheel (70) being connected to a first chamber (84) on the ram (76) attached to the other wheel (70); and a second chamber (86) on the ram (76) attached said one wheel (70) being connected to a second chamber (86) on the ram (76) attached to said other wheel (70), by hydraulic hoses (78), to form closed hydraulic circuits; so the movement of one wheel (70) will be transmitted to the other wheel (70).

17. The trailer (10) according to claim 16, wherein restrictors (82) are provided in the hoses (78) to provide damping.

18. The trailer (10) according to claim 16, wherein an isolation valve (80) is provided in at least one hydraulic hose (78) by which the position of the self steering wheels (70) may be locked.

19. The trailer (10) according to claim 1, wherein means (26) is provided for pivotally mounting the trailer (10) in a recovery vehicle.

20. The trailer (10) according to claim 19, wherein trunions (26) are provided for engagement of a bracket (90) mounted within a recovery vehicle.

21. The trailer (10) according to claim 1, wherein means (94) is provided for controlling movement of the trailer (10) between its stowed and deployed positions.

22. The trailer (10) according to claim 21, wherein said means (94) comprises a winch.

23. The trailer (10) according to claim 1, wherein means (92) is provided for locking the trailer (10) in a stowed position, within a recovery vehicle.

* * * * *